Figure 1:
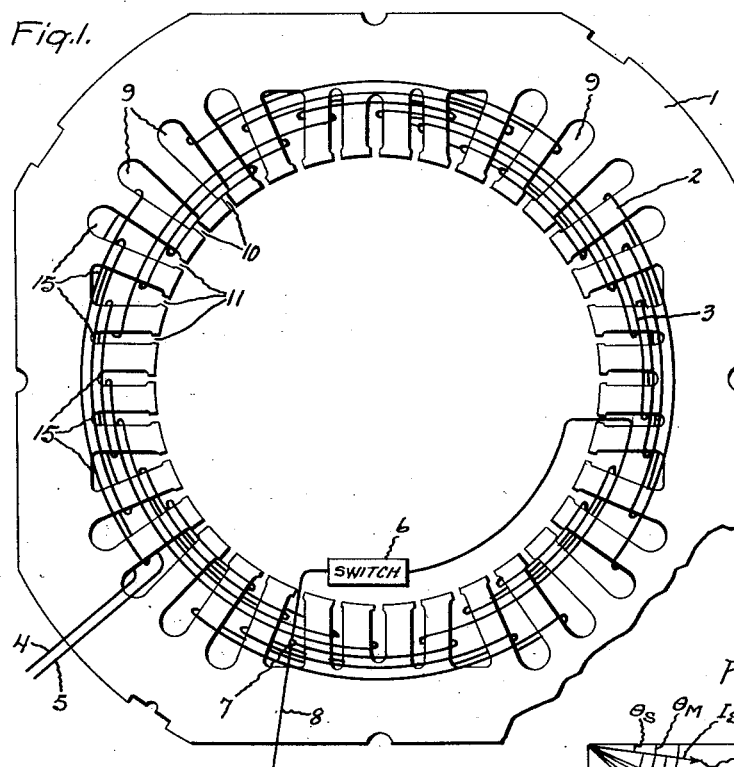

June 11, 1957 — F. W. SUHR — 2,795,712
ELECTRIC MOTOR STATOR
Filed Nov. 5, 1954

Inventor:
Fred W. Suhr,
by His Attorney.

United States Patent Office

2,795,712
Patented June 11, 1957

2,795,712

ELECTRIC MOTOR STATOR

Fred W. Suhr, Fort Wayne, Ind., assignor to General Electric Company, a corporation of New York Application November 5, 1954, Serial No. 467,151

4 Claims. (Cl. 310—198)

This invention relates to dynomoelectric machines, and more particularly to an improved stator for use in such machines.

There are many applications wherein it is found desirable to use electric motors of the resistance split phase type. There are alternating current, single-phase motors each provided with a start field winding and a main field winding. The start winding is wound to have a higher resistance than the main winding, and is physically displaced therefrom. The difference in the resistance of the windings causes an electrical displacement, or phase angle difference, between them. This angular difference will serve to provide a starting torque, as will be explained below, to start the motor. There is generally provided, in series with the start winding, some device to cause the start winding to be cut out as the motor comes up to speed, and the motor will thereafter run on the main winding alone.

It is, of course, desirable to achieve a high starting torque; however, motors of this type are frequently used in home appliances, such as washing machines, and therefore there is a definite limitation on the maximum current such a motor may draw when starting. Thus, it is necessary to maintain the starting current at or below a predetermined level while providing all possible starting torque. There are practical physical limitations on increasing the phase difference between the start current and the main current by increasing the resistance of the start winding, since such an increase beyond a certain point will cause utilization of an undue amount of power merely to cause the current to pass through the winding. The stators in such motors are, as is customary, formed of stacks of superimposed thin laminations of magnetic material. It is, therefore, desirable to provide a stator with punchings so formed that it will provide a resistance split phase motor with high starting torque without an accompanying undesirable high starting current.

It is, therefore, an object of this invention to provide an improved stator for resistance split phase motors having the desirable features set forth above.

Further objects and advantages of this invention will become apparent and the invention will become better understood by reference to the following description and the accompanying drawing, and the features of novelty which characterize this invention will be pointed out with particularity in the claims annexed to and forming a part of this specification.

This invention, in its broadest aspects, provides a stator punching adapted to receive a start winding and a main winding in its slots. The punching is provided with at least one slot which is adapted to receive the main winding but not the start winding. This slot is provided with a deeper and narrower opening to the bore than the remaining slots. This feature provides increased permeance to slot leakage flux since the permeance is a function of the ratio of the depth of the slot opening to the width thereof. The increase in permeance provided by the shape of the slot creates an increase in the phase displacement of the main winding current without any corresponding increase in the angle of the start winding current since the start winding is not wound in the slot. This will effect a larger differential angle between the two.

The starting torque is measured by the formula $$T \text{ oz. ft.} = \frac{225.4}{\text{synchronous R. P. M.}} A R_{2s} I_m I_s [\text{sine } (\theta_m - \theta_s)]$$

where $$A = \frac{\text{effective turns of start winding}}{\text{effective turns of main winding}}$$

$R_{2s}$=apparent secondary resistance referred to main winding, $I_m$ and $I_s$ are the main winding current and start winding current magnitudes respectively, and $\theta_m$ and $\theta_s$ are the main winding current phase displacement and start winding current phase displacement respectively. It will be seen that an increase in the differential angle $(\theta_m - \theta_s)$ will produce an increase in the torque T. Since, however, only the angle between the two current vectors has increased, the total starting current resulting from the two vectors will not show an increase and thus an increase in the starting torque will have been provided without the undesired increase in starting current. It will be understood that it is preferable to provide one pair of such slots for each pole of the main winding for uniform operation of the motor. It will further be understood that the amount that the depth of the slot is increased is limited by the amount of coil wound in the slot and that too great an increase in the slot depth will require a sacrifice of the amount of conductor wound in the slot.

Figure 3:
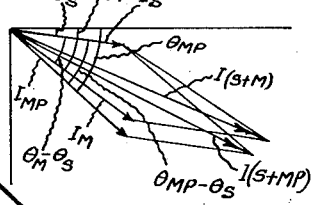
Figure 2:
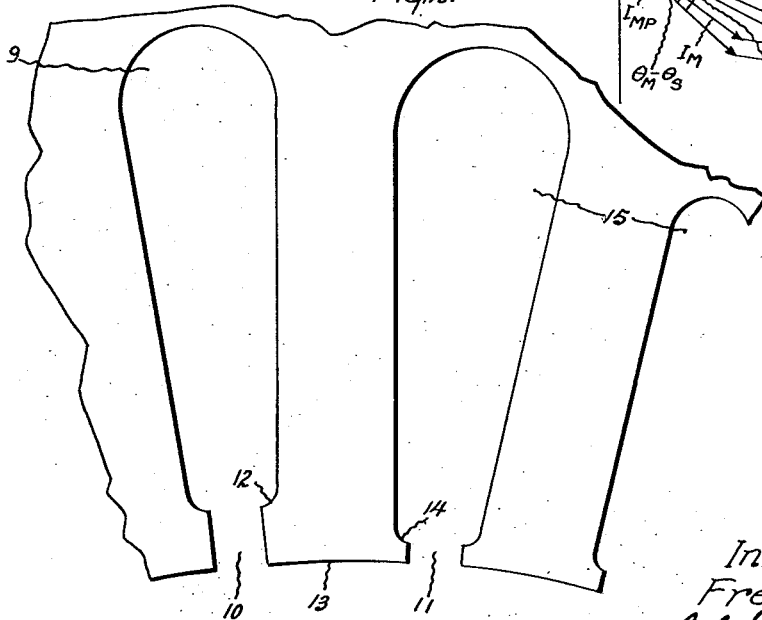

In the drawing, Figure 1 is a front view of a stator incorporating the improved features of this invention, and showing schematically main and start windings;

Figure 2 is a fragmentary enlarged view of a portion of the punching of Figure 1; and Figure 3 is a vector diagram setting forth the results of the improved structure.

Referring now to Figures 1 and 2 of the drawing, there is shown a stator punching, generally indicated at 1, which is adapted to be used in a resistance split-phase motor having a four-pole main field winding 2 and a four-pole start field winding 3. Windings 2 and 3 are connected in parallel with each other, as shown by lead-in wire 4 to main winding 2, and lead-in wire 5 to start winding 3. A suitable switch, such as indicated by 6, may be inserted in series with start winding 3 to cause the start winding to open when the motor comes up to speed. Switch 6 may be, as is well known, either centrifugal, to respond directly to motor speed, or a relay arranged to be responsive to the current in the main winding. The start winding may be joined to main winding 2, as at 7, and the lead-out wire 8 provided.

Each pole of the main winding is provided with a pair of slots 9 in which only the main winding is wound. Each slot 9 has a relatively deep and narrow slot opening 10, as opposed to the wider and shallower slot opening 11 which is formed for the remainder of the slots 15. This is most clearly brought out in Figure 2 wherein it will be seen that the top 12 of slot 9 is at a considerably greater distance from the bore 13 of the stator punching than top 14 of any of the other slots 15. It is well known that the major part of the flux generated crosses the air gap to the rotor; however, there is always a certain amount of flux, known as slot leakage flux, which, instead, leaks across the slot opening, as well as the rest of the slot, and thus merely encircles the slot. As this slot leakage flux increases, the reactance of the slot is increased and a corresponding increase will occur in the phase angle of the winding in the slot. In view of the nature of the slot leakage flux, it is apparent that a decrease in the width of the slot opening, or an increase in its length, or any combination of the two, will increase the permeance, or receptivity, to slot leakage flux. It will therefore be seen that slot 9 provides much greater permeance than slot 15. This increase in permeance of slot 9 will increase the phase angle of the current passing through any coil wound in that slot.

As set forth in Figure 1, only the main winding 2 is wound into slot 9, starting winding 3 being wound therearound. Thus, the phase angle of the main winding current will increase from that shown by the line $I_m$ in Figure 3 to that shown by the line $I_{mp}$. Since the start winding is not wound in the high permeance slot, the phase angle of the start winding current will remain at $\theta_s$. It will, therefore, be seen that the high permeance slot 9 increases the angle of split from $\theta_m$ minus $\theta_s$ to $\theta_{mp}$ minus $\theta_s$. It will further be seen from a comparison of $I_{s+m}$, which represents the current required to start the motor without the improvement of this invention, and $I_{s+m}$, which is the current required to start the motor including the improved construction of this invention, that the two are almost identical and that no undue increase in current will occur because of the increase in the amount of $\theta_{mp}$ minus $\theta_s$. It will be observed that the only item of the torque formula changed by the change in construction is $\theta_m$, which is increased so that the amount represented by the sine of the angle $(\theta_m - \theta_s)$ is also increased. This will increase the starting torque of the motor without, as has been shown, a corresponding increase in the starting current.

It will, of course, be understood that the invention may be applied to motors having different numbers of poles, and that it is only necessary to modify the number of high permeance slots in accordance with the change in the number of poles.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A stator for a resistance split-phase electric motor having formed therein a plurality of slots, a main winding positioned in some of said slots so as to form poles, a start winding positioned in some of said slots so as to form poles, a majority of said slots having relatively wide shallow openings to the bore of said motor, at least one slot in each main winding pole having a relatively narrow deep opening to the bore of said motor thereby to increase the permeance of said slot, said one slot in each main winding pole being adapted to have only said main winding arranged therein.

2. A stator for a resistance split-phase electric motor having formed therein a plurality of slots, a main winding arranged in some of said slots as four equispaced poles, and a start winding arranged in some of said slots as four equispaced poles, a majority of said slots having relatively wide shallow openings to the bore of said motor, the two end slots in each main winding pole each having a relatively narrow deep opening to the bore of said motor thereby to increase the permeance of said end slots, said end slots being adapted to have only said main winding arranged therein.

3. A stator for a resistance split-phase electric motor having a plurality of slots formed therein, a main winding arranged in some of said slots, a start winding arranged in some of said slots, at least one of said slots being arranged to receive said main winding only, the majority of said slots being formed respectively with relatively shallow slot openings to the bore of said motor, said one slot being formed with a relatively deep slot opening to the bore of said motor thereby to increase the permeance thereof.

4. A stator for a resistance split-phase electric motor having a plurality of slots formed therein, a main winding arranged in some of said slots, a start winding arranged in some of said slots, at least one of said slots being arranged to receive said main winding only, the majority of said slots being formed respectively with relatively wide slot openings to the bore of said motor, said one slot being formed with a relatively narrow slot opening to the bore of said motor thereby to increase the permeance thereof.

References Cited in the file of this patent

UNITED STATES PATENTS

| 416,193 | Tesla | Dec. 3, 1889 |
| 924,725 | Bergman | June 15, 1909 |
| 2,649,561 | Hutchins | Aug. 18, 1953 |

FOREIGN PATENTS

| 801,985 | France | May 30, 1936 |
| 845,418 | France | May 15, 1939 |
| 334,070 | Germany | Mar. 10, 1921 |